W. Veber Jr.
Milk-Shelves.
Nº 76120     Patented Mar. 31, 1868.
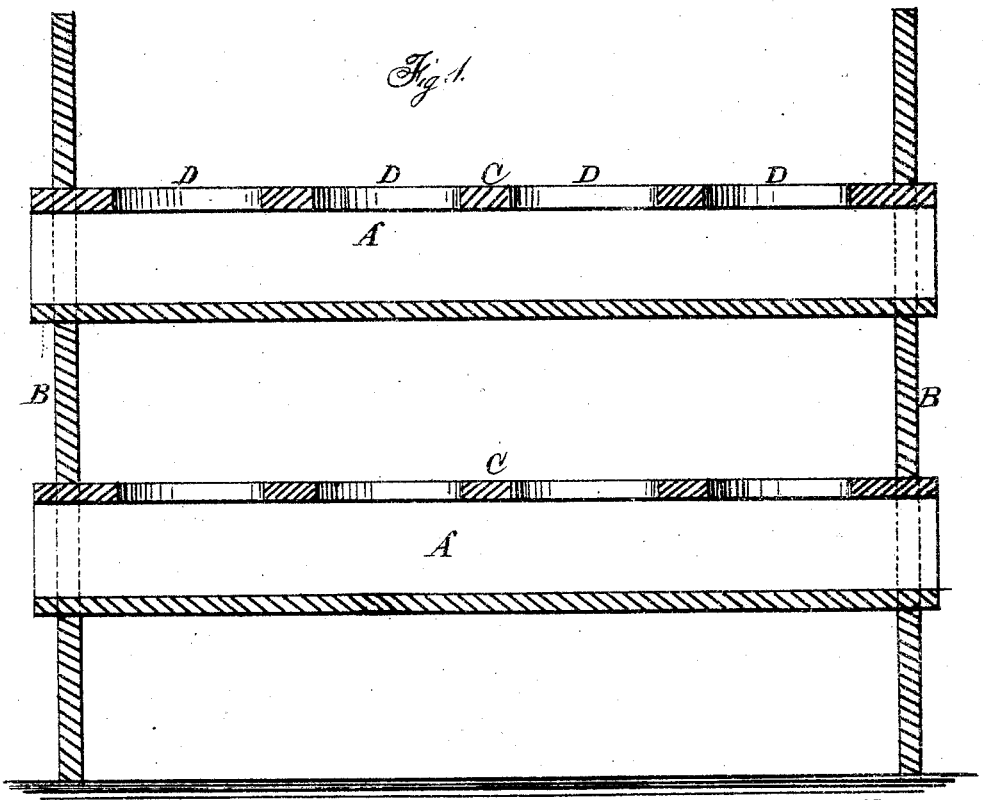
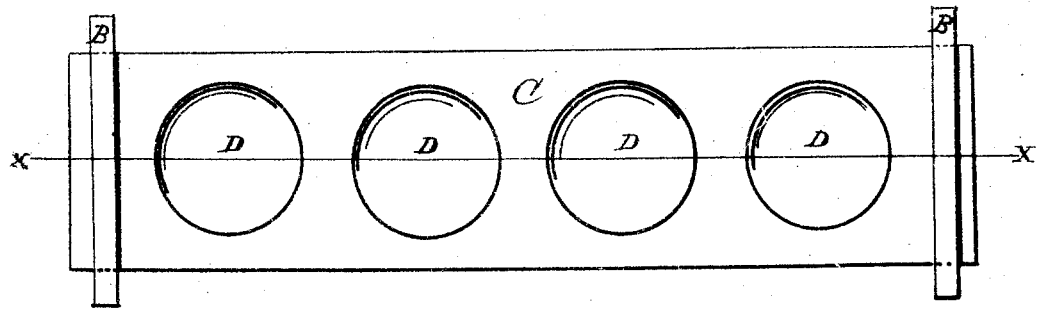
Witnesses.
W. C. Ashkettle
Wm. A. Morgan
Inventor
W. Veber Jr
per Munn & Co
Attorneys

United States Patent Office.

WILLIAM VEBER, JR., OF SHINGLE CREEK, NEW YORK.

Letters Patent No. 76,120, dated March 31, 1868.

IMPROVEMENT IN MILK-SHELVES.

*The Schedule referred to in these Letters Patent and making part of the same.*

---

TO ALL WHOM IT MAY CONCERN:

Be it known that I, WILLIAM VEBER, Jr., of Shingle Creek, in the county of St. Lawrence, and State of New York, have invented a new and improved Milk-Shelf; and I do hereby declare that the following is a full, clear, and exact description thereof, which will enable those skilled in the art to make and use the same, reference being had to the accompanying drawings, forming part of this specification.

This invention relates to a new and improved method of constructing shelves for setting milk, so as to allow the cream to rise for making butter.

It is a fact with which the manufacturers of butter are familiar, that a current of air is necessary to keep the milk at the proper temperature in order to produce the greatest quantity of cream; but it is also well known that if a current of air is allowed to come in contact with the surface of the milk, a tough coating on the cream is produced, which it is very difficult, if not impossible, to reduce to butter. This coating breaks up in the process of churning, and forms what are known as "white caps," a portion of which goes off with the buttermilk, and another portion goes into the butter. This latter portion is very damaging to the butter. Much of the frowy or strong butter in market is produced thereby.

To avoid this difficulty, and to devise means for producing cream of uniform quality, I provide tubular shelves with suitable orifices in which to set the pans, whereby a current of cool air is made to circulate around the pans of milk without coming in contact with the surface, and in this my invention consists.

Figure 1 is a sectional elevation or side view of two tubular milk-shelves arranged according to my invention, the section being through the line $x$ $x$ of fig. 2.

Figure 2 is a top view of one of the shelves.

Similar letters of reference indicate corresponding parts.

A represents the tubular shelf, which is a square box or tube open at each end, as seen in the drawing, which ends pass through the sides of the milk-house or building. B represents the walls or sides of the building in which the shelves are placed. C represents the top of the tubular shelf. D represents orifices through this top C, of size or diameter sufficient to receive the pans, so that they may be suspended and sustained therein.

The pans may be of such size or diameter that they will drop down to near their upper edge or rim, if desired, so that the bottom and sides will be exposed to the current of air which will circulate through the tube, while the surface of the milk will be protected therefrom.

Doors or shutters may be attached to the ends of the tube, to exclude the air in whole or in part, when deemed necessary.

I claim as new, and desire to secure by Letters Patent—

The tubular shaft A, arranged with reference to the milk-pans and the building or milk-house, substantially as shown and described, for the purposes set forth.

The above specification of my invention, signed by me, this     day of     , 1868.

WILLIAM VEBER, Jr.

Witnesses:
   N. H. HALL,
   HENRY W. TUTTLE.